United States Patent [19]

McNew

[11] Patent Number: 4,486,093

[45] Date of Patent: Dec. 4, 1984

[54] SYSTEM FOR PASSING ELONGATED PAPER THROUGH A REPRODUCING APPARATUS

[76] Inventor: Thomas A. McNew, 401 NW. 43rd St., Oklahoma City, Okla. 73118

[21] Appl. No.: 491,438

[22] Filed: May 4, 1983

[51] Int. Cl.³ .............................................. G03B 29/00
[52] U.S. Cl. ...................................... 355/29; 355/72; 355/75
[58] Field of Search ...................... 355/29, 13, 72, 75; 226/109

[56] References Cited

U.S. PATENT DOCUMENTS

| | | | |
|---|---|---|---|
| 4,087,172 | 5/1978 | Van Dongen | 355/75 |
| 4,185,760 | 1/1980 | McNew | 226/109 |
| 4,191,467 | 3/1980 | Schieck | 355/72 |
| 4,300,710 | 11/1981 | Dubois et al. | 355/75 |
| 4,365,733 | 12/1982 | McNew | 355/72 |

Primary Examiner—Monroe H. Hayes
Attorney, Agent, or Firm—William R. Laney

[57] ABSTRACT

A system for passing long fan-folded documents and correspondingly lengthy copy paper through a reproducing apparatus, and including a frame attachable to the reproducing apparatus and adapted to support a roll of copy paper, and further including a feed tray detachably mounted on a reproducing apparatus and having a partition plate selectively positionable in the feed tray to facilitate containment in the tray of a fan-folded document to be reproduced. The feed tray includes a bottom plate having downwardly projecting ribs to detachably mount the tray on the reproducing machine, and upwardly projecting ribs spaced from a paper discharge slot at the front side of the tray, and acting as an indexing abutment for contacting and positioning the fan-folded document in the tray. The copy paper roll supporting frame has mounted thereon a cutting wire detent stud and a pivotable cocking lever. A spring biased cutting wire has one end connected to the supporting frame and its other connected to the cocking lever. Pivotation of the cocking lever extends the wire over the detent stud and loads the spring in tension. A trip lanyard is connected to a detent release lever which can be pivoted by the lanyard to release the cutting wire from its detent, thereby severing the copy paper at a selected location.

16 Claims, 12 Drawing Figures

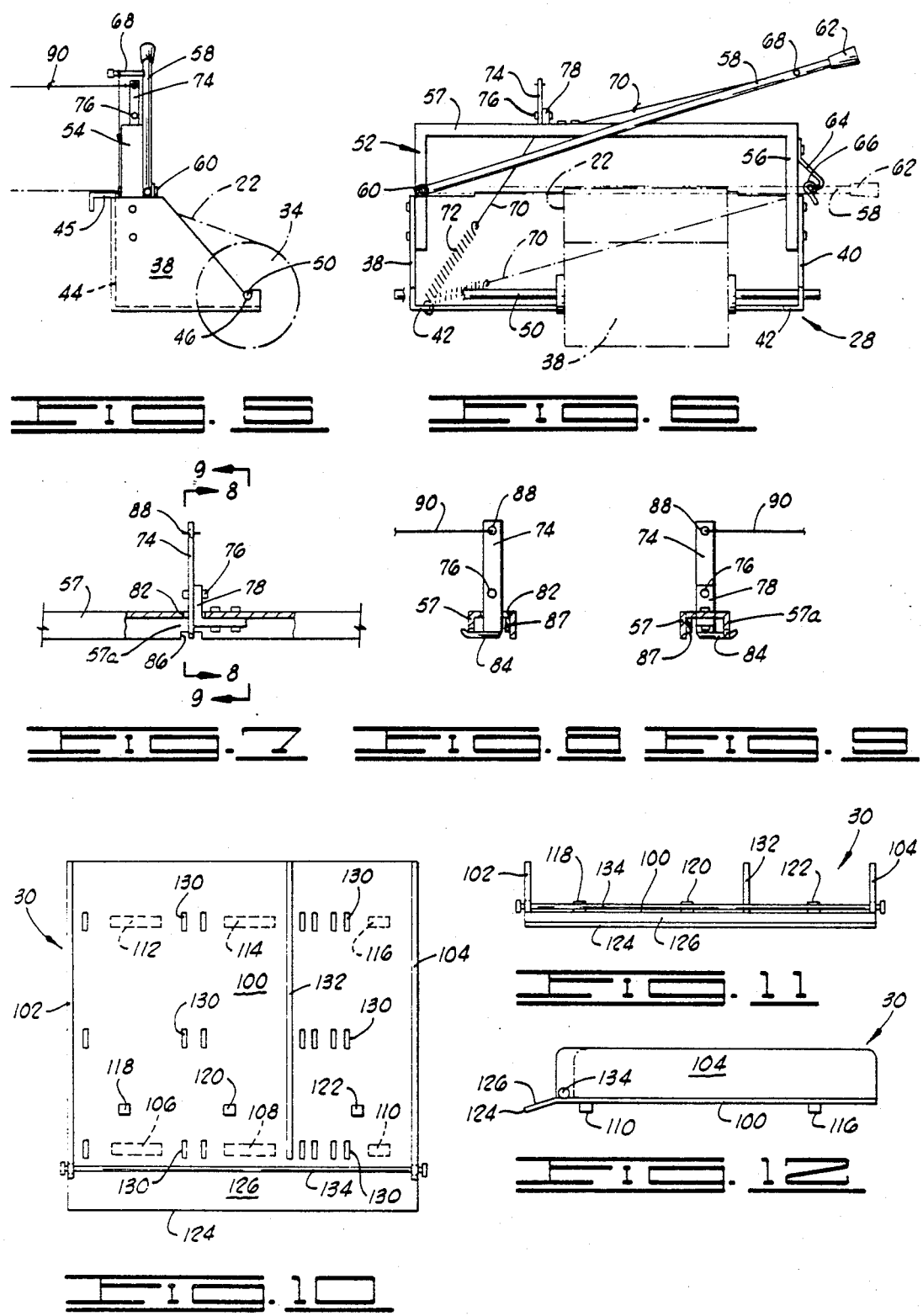

SYSTEM FOR PASSING ELONGATED PAPER THROUGH A REPRODUCING APPARATUS

BACKGROUND OF THE INVENTION

1. Field of the Invention

This invention relates to accessory equipment used in conjunction with reproducing machines for feeding and receiving papers passed through such machines for purposes of producing copies. More specifically, but not by way of limitation, the invention relates to apparatus for feeding elongated original documents and copy paper to a xerographic reproducing machine, and it relates to a subassembly within that apparatus for severing roll-fed copy paper upon completion of the making of each copy.

2. Brief Description of the Prior Art

In my U.S. Pat. No. 4,185,760 entitled "SYSTEM FOR FEEDING ELONGATED DOCUMENTS TO REPRODUCING APPARATUS" filed on May 22, 1978, and issued Jan. 29, 1980, I describe a system by means of which elongated, relatively narrow sheets of copy paper may conveniently be fed to a xerographic copying machine in synchronization with the feeding to the machine of an elongated fan-fold type original document. This system satisfied a need in enabling the conventional xerographic copying apparatus to be utilized for producing continuous, elongated copies of such similarly elongated original documents as galley proofs of manuscripts, oil and gas well logs, electrocardiograms, teletype printouts, strip charts made on various types of continuous recorders, adding machine tapes, computer printouts, the output of graphic plotters and seismic data, and the like.

The apparatus described in my U.S. Pat. No. 4,185,760 comprises a collapsible, vertically extending A-frame which includes a pair of opposed, vertically extending divergent sides pivotally connected to each other at their upper ends and having their lower ends horizontally spaced from each other. The two sides of the A-frame carry paper roll supporting elements upon which active and standby rolls of elongated copy paper can be supported for selective feeding to the xerographic copying machine. The A-frame further carries at its upper end, and provides support for, a feed tray which has one end detachably engaged with the upper side of the A-frame and the other end supported adjacent a paper feeding mechanism constituting a subassembly conventionally included in such reproducing or copying apparatus.

In my U.S. Pat. No. 4,365,733, I disclose a more compact supporting stand for supporting and feeding elongated copy paper from rolls carried on the stand, and an improved paper feed tray for feeding the fan-folded original documents to the reproducing machine. The stand employed can be quickly and easily set up adjacent the copying machine, and when not in use can be folded compactly into a relatively small volume. The feed tray employed for feeding the fan-folded original documents to the copying machine is selectively positionable to facilitate feeding fan-folded documents of various widths in a trouble-free fashion.

When using the systems described in the cited U.S. Pat. No. 4,365,733, it is necessary with that system, as with all others known to me, for the operator to cut or sever the copy paper at the completion of the making of a copy. This functions to disconnect the completed copy from the remainder of the copy paper roll, and to prepare a square cut on the leading end of rolled paper, thereby facilitating feeding this leading end into the copy machine as the next copy is started. In some systems this is accomplished manually, as in the system disclosed in my U.S. Pat. No. 4,365,733, and in others sharp blades are actuated to cut the paper.

Manual severance is time consuming and difficult to do accurately, and requires the operator to move to a position adjacent the feeding side of the copying machine. The operator is thus precluded from attending to the folding up of the copy which is continuing to emerge from the machine at this time, causing undesirable delay, and in some cases, hastily and improperly fan-folded copy.

The same necessity to temporarily leave the emerging copy unattended characterizes the bladed devices now in use. Moreover, such severance blades are dangerous and jeopardize the safety of the operator.

BRIEF DESCRIPTION OF THE PRESENT INVENTION

Broadly described, the system for passing elongated paper through a reproducing apparatus as constructed in accordance with the present invention includes two subassemblies. The first of these is the copy roll supporting and web cutoff subassembly which functions to support a roll of elongated copy paper and position this paper for optimum feeding to a reproducing or copying machine. The subassembly also functions to facilitate remote, semi-automatic severance of the copy paper after the making of each copy. A second important subassembly is the feed tray, which is especially constructed to facilitate mounting on the copying machine, and for containment of one or a plurality of fan-folded elongated original documents supported in a fan-folded stack within the tray, and fed therefrom to the copying machine. A document collection tray is detachably connected to the copying machine, and positioned to intercept the original documents after they have been passed through the copying machine.

The copy roll supporting subassembly more specifically includes a copy paper roll supporting frame having a cutting wire detent stud mounted thereon. The frame includes a pair of copy paper roll supporting elements, horizontally spaced from each other for supporting a copy paper roll. The roll supporting subassembly further includes a pivotally mounted cocking lever and a spring biased cutting wire or flexible member which has one of its ends connected through a spring to the supporting frame and its other end connected to the cocking lever so that pivotation of the cocking lever extends the cutting wire over the detent stud and loads the spring in tension. A trip lanyard is connected to a detent stud release lever which can be tripped by the lanyard to release the cutting wire from the detent stud, thereby severing the copy paper.

The feed tray is of generally rectangular configuration and includes a bottom plate which has indexing ribs projecting from the lower side thereof to facilitate detachable securement of the feed tray to the upper side of a copying machine while it is in use. Stop ribs also project upwardly from the upper side of the bottom plate of the feed tray and serve to index and arrest movement of the forward edge of a stacked, fan-folded original document. A dancer bar extends across the front of the feed tray, and functions to hold down, guide and facilitate the unfolding of the fan-folded original document as it is fed to the copying machine from the feed tray.

An important object of the present invention is to provide a system which can accurately and truly concurrently feed elongated, fan-folded original documents and elongated copy paper through a reproducing apparatus for the purpose of transferring indicia, by a copying process, from the fan-folded original to the copy paper. Alternatively, the portion of the system in which the fan-folded original documents are located during feeding to the copying machine can be used independently of the copy roll supporting subassembly forming that part of the system by which the copy paper is fed to the copying machine.

Another object of the invention is to provide a copy paper severing apparatus for semi-automatically severing elongated copy paper fed to a copying machine from a roll and doing so safely.

A further object of the invention is to provide a system for passing elongated original fan-folded documents through a copying machine, which system includes a document collection tray detachably mounted on the copying machine to receive, and automatically stack in a fan-folded configuration, the original document after it has passed through the copying machine and is being discharged therefrom.

A further object of the invention is to provide a relatively economical, easily installed and used system by which elongated documents can be fed to a xerographic copy machine at the same time that an elongated copy paper is being fed to the machine.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 5 is a side elevation view of the copy roll supporting subassembly illustrated in FIG. 4, and showing in dashed lines a roll of copy paper supported on the subassembly.

FIG. 6 is an enlarged front elevation view of the copy roll supporting subassembly, and showing two alternate positions of the cocking lever and a flexible wire or cutting element in solid lines and in dashed lines.

FIG. 7 is a detail view, partially in section, showing a detent release lever forming a part of the copy roll supporting subassembly.

FIG. 8 is a sectional view taken along line 8—8 of FIG. 7.

FIG. 9 is a sectional view taken along line 9—9 of FIG. 7.

FIG. 10 is a plan view of the original document feed tray provided for feeding original documents to the copying machine.

FIG. 11 is an end elevation view of the document feed tray shown in FIG. 10.

FIG. 12 is a side elevation view of the document feed tray.

DETAILED DESCRIPTION OF A PREFERRED EMBODIMENT OF THE INVENTION

Figures 1, 2, 3, 4:
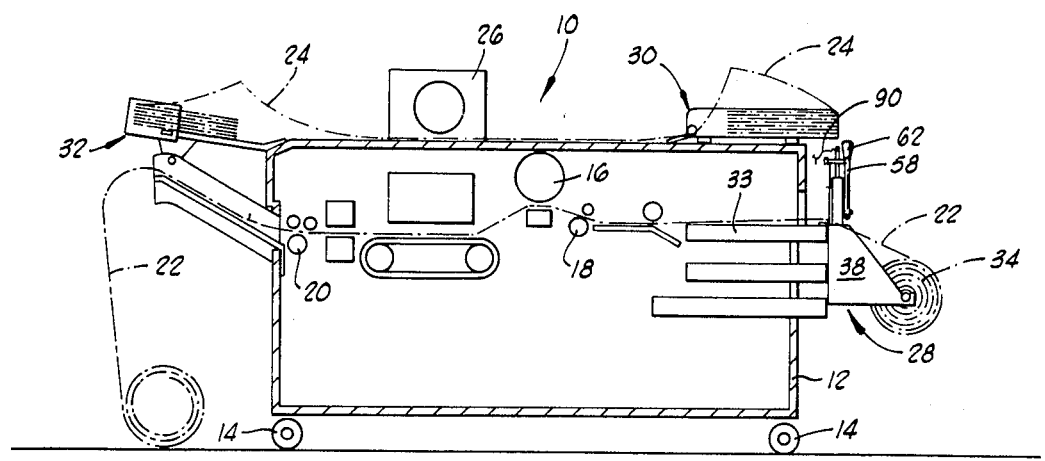
FIG. 1 is a view, partially in side elevation and partially in section, illustrating a preferred embodiment of the system of the invention as it is positioned in relation to, and used in combination with, a xerographic copying machine.
FIG. 2 is a plan view of the system and copying machine depicted in FIG. 1. Paper being passed through the copying machine is illustrated in dashed lines.
FIG. 3 is an end elevation view of the system of the present invention positioned adjacent a copying machine and illustrating, in dashed lines, copy paper and fan-folded original documents as they are being fed to the copying machine.
FIG. 4 is a plan view of the copy roll supporting subassembly of the invention and illustrating in dashed lines a copy roll as it is supported in this subassembly.

Referring initially to FIG. 1 of the drawings, shown therein is a copying or reproducing machine designated generally by reference numeral 10. The illustrated copying machine is of the xerographic type, and includes a housing 12 mounted upon suitable casters or rollers 14. On the interior of the housing, the copying machine includes a xerographic drum 16, copy paper feed rollers 18 and copy paper discharge rollers 20. The feed rollers 18 and discharge rollers 20 and the equipment associated therewth are conventional in such machines, and are used to pass a copy paper beneath the xerographic drum for purposes of transferring indicia thereto from an original document passed through the copying machine in a manner hereinafter described.

In the drawings under discussion, an elongated, relatively narrow sheet of copy paper is illustrated in dashed lines and is designated by reference numeral 22. An original document to be copied using the copying machine 10 is designated by reference numeral 24. It is shown being passed through a feed mechanism 26.

The system for passing elongated papers through the copying machine 10 as constructed in accordance with the present invention includes a copy roll supporting subassembly, designated generally by reference numeral 28, an original document feed tray, designated generally by reference numeral 30, and a document collection tray, designated generally by referance numeral 32.

As illustrated in FIG. 1, the copy roll supporting subassembly 28 is mounted adjacent the copying machine 10 by attachment to a conventional sheet-type copy paper feed tray 33, and functions to feed the elongated copy paper 22 from a copy paper roll 34.

The copy roll supporting subassembly 28 includes a roll supporting frame 36 which is made up of a pair of spaced, vertically extending, trapezoidally-shaped end plates 38 and 40 each of which has an inturned, horizontally projecting flange 42 extending along the lower edge thereof. At the vertically extending back edges of each of the end plates 38 and 40, a vertically extending back plate 44 extends between and interconnects the end plates. Each of the end plates 38 and 40 is provided adjacent its lower forward side with a recess 46 for receiving and rotatably supporting a copy roll axle 50 as shown in FIG. 6. A downwardly opening angle flange 45 is secured to the upper edge of the back plate 44 and is used to attach the copy roll supporting subassembly 28 to the copy paper feed tray 33.

A bracket 52 of inverted U-shaped configuration includes a pair of downwardly extending, parallel legs 54 and 56 which are secured to the facing sides of the two end plates 38 and 40 of the roll supporting frame 36. The bracket 52 further includes a transverse web portion 57 which is of channel shape or stated differently, is of inverted U-shaped cross-sectional configuration.

An elongated cocking lever 58 has one of its ends pivotally connected to the U-shaped bracket as illustrated at 60, and has a hand grip element 62 carried on its opposite end. For the purpose of retaining the cocking lever 58 in a cocked status as hereinafter described, an S-shaped cocking lever engaging spring 64 is bolted or otherwise suitably secured to an outer face of the leg 56 of the bracket 52 as illustrated in FIG. 6. The cocking lever engaging spring 64 includes a reverse bent portion which defines a receiving bight 66 into which a latching pin 68 carried on the cocking lever 58 is received when the cocking lever is cocked as hereinafter described.

A cutting wire or flexible member 70 has one of its ends connected to the free end of the latching pin 68 carried on the cocking lever 58, and has its opposite end secured to one end of a spring 72. The spring 72 has its end opposite from that which is connected to the flexible cutting element or wire 70 connected to the inturned horizontal flange 42 carried on the end plate 38 as illustrated in FIG. 6.

A detent release lever 74 is pivotally connected by a pivot pin 76 to an angle bracket 78 which is bolted to the channel section which forms the upper, horizontally extending web portion 57 of the U-shaped bracket 52. This construction is shown in FIGS. 7-9 where it will be noticed that the angle bracket 78, as well as the detent release lever 74 which is pivotally mounted thereto, project through an opening 82 formed in the upper side of the web portion 57 of bracket 52.

The detent release lever 74 carries at its lower end, a detent stud 84 which projects through an opening 86 in a side flange 57a of the channel-shaped web 57 of the U-shaped bracket 52 as shown in FIGS. 7-9. On the opposite side of the lever 74 from the detent stud 84, a small rubber pad 87 is mounted between the lever and a flange of the web 57. The outer lower side of the detent stud 84 is radiused as shown in FIGS. 8 and 9. The detent release lever 74 also carries a lanyard pin 88 which projects through the upper portion thereof to opposite sides of the detent release lever. The lanyard pin 88 functions as a point of securement of one end of a flexible lanyard 90. It will be perceived in referring to FIGS. 8 and 9 that when the flexible lanyard 90 is pulled, the detent release lever 74 is caused to pivot to thereby retract the detent stud 84 through the opening 86 in the web portion 57 of the bracket 52.

The original document feed tray 30 is illustrated in FIGS. 10-12. The document feed tray 30 includes a substantially horizontally extending flat bottom plate 100 which, in the illustrated embodiment, is of rectangular configuration. The bottom plate 100 has a pair of opposite side edges at which it is secured to a pair of upwardly extending side plates 102 and 104.

Secured to the under surface of the bottom plate 100 at spaced locations thereon are a plurality of forward indexing ribs or studs 106, 108 and 110 and a plurality of rear indexing ribs or studs 112, 114 and 116. These indexing studs 106-116 are used to position the paper feed tray 30 atop the xerographic copying machine and retain it in a proper location for the purpose of feeding an original fan-folded document to the copying machine. The bottom plate 100 of the feed tray 30 also carries a plurality of paper stop studs 118, 120 and 122 spaced horizontally from each other across the width of the bottom plate 100 and projecting upwardly from the upper surface thereof at a location spaced inwardly a substantial distance from the front edge 124 of the bottom plate 100. It will be noted in referring to FIGS. 10 and 12 that the forward portion 126 of the bottom plate 100 is downwardly inclined. The forward portion 126 is bent downwardly to facilitate guidance of, and support for, the fan-folded original document as it moves out of the feed tray 30 toward and into the copy machine mechanism.

A plurality of divider plate indexing slots 130 extend through the bottom plate 100. It will be noted that the divider plate indexing slots 130 are arrayed in groups of three which are aligned parallel to the side edges of the bottom plate 100. The divider plate indexing slots 130 function to permit a divider plate 132 having a plurality of downwardly projecting tabs (not visible) on the lower edge thereof to be placed in a selected location on the bottom plate 100. The feed tray 30 is thus divided into a pair of paper bins of selected width when the divider plate 132 is placed in position. The divider plate 132 can be selectively placed at any one of several positions between the sides edges of the bottom plate 100 to alter the width of the paper bins which are formed between the divider plate and the two side plates 102 and 104 of the feed tray. The purpose of this arrangement is to permit original documents of varying sizes to be fed to the copying machine, and, as will be desirable in some instances, to permit a pair of original documents, placed in side-by-side relation on opposite sides of the divider plate 132 and on top of the bottom plate 100, to be simultaneously fed to the copying machine for the purpose of concurrently copying two original fan-folded documents.

At the forward side of the feed tray 30, a paper guiding dancer rod 134 is rotatably mounted through openings formed in the side plates 102 and 104.

OPERATION

In utilizing the system of the invention, the document collection tray 32 is mounted on the xerographic reproducing or copying machine 10 in the manner described in my U.S. Pat. No. 4,365,733. When so mounted, it is positioned for receiving and causing the folding up into a fan-folded stack, the original document being copied by the use of the copying machine.

The original document feed tray 30 is then mounted on the upper side of the copying machine 10 by engaging of the front indexing studs 106-110 and rear indexing studs 112-116 with registering openings, recesses or raised detents formed on the upper side of the copy machine. The divider plate 132 is then placed in selected position on the upper side of the bottom plate 100 of the feed tray 30 in accordance with the type of fan-folded original document or documents which are to be fed to the copy machine for copying purposes. If, for example, it is desired to copy simultaneously, two relatively narrow widths of original well logs developed in the course of production of oil and gas, the divider plate 132 may be appropriately placed atop the bottom plate 100 of the feed tray 30 so that both logs can be run concurrently from two side-by-side fan-folded stacks. In some other usages of the feed tray 30, the divider plate 132 can be completely removed.

The document 24 to be copied, which is in fan-folded configuration, is placed on the bottom plate 100 so that the aligned forward fold edges of the fan-folded document bear against the paper stop studs 118 and 120 and 122. The leading edge of the fan-folded document is then brought up and over the stack and is threaded under the dancer rod 134 near the front of the feed tray.

The leading edge of the document 24 is further passed downwardly across the downwardly inclined front portion 126 of the bottom plate 100 and into the feed mechanism 26 of the copy machine 10.

Before starting the copy machine, and with the document thus in position and ready for copying, the copy roll supporting subassembly 28 is mounted on the copy machine by hooking the angle flange 45 carried at the upper edge of the back plate 44 of the roll supporting frame 36 over the conventional sheet-type copy paper feed tray 33. With the copy roll supporting subassembly 28 thus mounted on the copy machine 10, a roll 34 of elongated continuous copy paper is placed on the roll supporting frame 36 by placing the end portions of the copy roll axel 50 in the recesses 46 provided to receive the axel and located in the lower rear portions of the end plates 38 and 40 of the roll supporting frame.

In order to prepare the system for semi-automatically severing the copy paper after completion of the copying of the original document, the cocking lever 58 is pivoted upwardly from the horizontally extending position shown in dashed lines in FIG. 6 to a position substantially higher than the full line position shown in that figure of the drawings. This motion of the cocking lever 58 has the effect of causing the flexible cutting member or wire 70 to move upwardly past the radiused lower edge of the detente stud 84. The flexible cutting element or wire 70 is guided in this movement by the side 57a of the web portion 57 of the bracket 52. After the cutting wire 70 has been moved upwardly by movement of the cocking lever 58 in the fashion described, the cocking lever is then pivoted downwardly to return it to the position illustrated in dashed lines in FIG. 6. This downward movement of the cocking lever 58 causes the cutting wire 70 to catch upon the detent stud 84 so that it is substantially tensioned and the spring 72 is therefore lengthened and placed in tension. The cutting wire 70 is now in a cocked, ready for cutting status. The cocking lever 58 is held in the cocked position by the receipt of the latching pin 68 in the receiving bight 66 of the S-shaped lever engaging spring 64.

The leading edge of the copy paper 22 is then led upwardly and across the upper side of the web portion 57 and angle flange 45 and across the sheet-type copy paper feed tray 33 into the copying machine as illustrated in FIGS. 1 and 5. The leading edge of the copy paper 22 is extended into engagement with the feed rollers 18 located in the copy machine 10. When the copy paper 22 is so positioned, it extends directly beneath the tensioned cutting member or wire 70.

The system is now prepared and in proper status for commencing the copying operation. The xerographic copying machine 10 is started in conventional fashion, and the elongated fan-folded original document is fed to the copying machine concurrently with the elongated continuous copy paper 22 from the roll 34. Unfolding of the original document is facilitated by the friction operated on the paper by the dancer bar 134. Copying proceeds until the elongated original document has been nearly completely copied. As the end of the copying of the original document approaches, the operator is at the left or discharge side of the copying machine, as it is illustrated in FIG. 1, and is occupied at this time with folding or rolling the copy as it emerges from the machine.

As copying of the original document nears completion, the operator prepares to sever the elongated copy paper by the semi-automatic operation of the copy severing elements of the copy roll supporting subassembly 28. The operator, standing at the discharge side of the copying machine 10, grasps the lanyard 90 in one hand and, as the trailing end of the original document leaves the feed tray 30, pulls the lanyard sharply. As the lanyard 90 is pulled, the detente release lever 74 is pivoted about the pivot pin 76. This retracts the detente stud 84 through the opening 86 and allows the cutting wire or flexible member 70 to be wiped off of the detent stud by the flange 57a. The spring 72, being under substantial tension at this time, contracts, and this causes the wire 70 to move very rapidly downwardly to the dashed line, uncocked position illustrated in FIG. 6. Movement of the cutting wire 70 in this fashion shears across and cuts the copy paper along a smooth and even transverse line extending precisely normal to the side edges of the copy paper. This is very desirable, since it assures that no difficulty will be experienced in threading the leading end of the next section of copy paper from the roll into the feed rolls of the copying machine.

It should be pointed out that the cutting wire or flexible member 70 is preferably of a relatively soft material, such as a textile type material, as opposed to a very thin, sharp metallic element. When such relatively soft textile cutting element is employed, it has been determined that the element is incapable of cutting, or even raising a welt on, the hand of an operator or a bystander if the hand should be placed in the path of the moving elongated cutting element after it is tripped. Yet this type of flexible cutting member cleanly and evenly severs the copy paper at precisely the desired location.

It should further be pointed out that if it should be desired, the copy roll supporting subassembly 28 of the present invention can be utilized upon a supporting stand of the foldable type which is illustrated in my U.S. Pat. No. 4,365,733 and which is there denominated by reference numeral 28. When so utilized, the copy paper supporting subassembly 28 of the present invention permits the semi-automatic, remotely actuated severing structure incorporated in the roll supporting subassembly of this invention to be beneficially employed to allow an operator to give full attention to the folding or rolling of the copy paper being discharged from the copy machine up to the instant when the trailing edge of a completed copy emerges. Severance of the copy paper from the discharge side of the copy machine can be easily effected by means of the severing elements utilized in the roll supporting subassembly of this invention.

Although certain preferred embodiments of the present invention have been herein described in order to illustrate the basic principles of the invention, it will understood that various changes and modifications in the illustrated and described structure can be effected without departure from those principles. Changes and modifications of this type are therefore deemed to be circumscribed by the spirit and scope of the invention, except as the same may be necessarily limited by the appended claims, or reasonable equivalents thereof.

What is claimed is:

1. A system for duplicating elongated documents comprising:
   a reproducing apparatus;
   a document feed tray engaged with the upper side of the reproducing apparatus for feeding thereto an elongated original document to be copied; and a copy paper roll supporting subassembly detachably mounted on the reproducing apparatus and including:
   a copy paper roll supporting frame;
   a bracket mounted on the frame;
   a detent release lever pivotally mounted on the bracket and having a detent stud thereon and movable therewith;
   a cocking lever pivotally mounted on the frame;
   elongated resilient paper cutting means having one end connected to the frame and the other end connected to the cocking lever, the cutting means, cocking lever and frame cooperating to engage a central portion of the resilient cutting means over the detent stud when the cocking lever is pivoted in first one direction and then the other; and
   actuating means connected to the detent release lever for pivoting the detent release lever to thereby disengage the cutting means from the detent stud when said actuating means is operated.

2. A system for duplicating elongated documents as defined in claim 1 wherein said cutting means comprises:
   an elongated textile string having one end connected to said cocking lever; and
   a spring having one end connected to the opposite end of said string from the end of the string connected to said cocking lever, and having its other end connected to said frame.

3. A system for duplicating elongated documents as defined in claim 1 wherein said frame includes:
   a pair of spaced, parallel end plates each having a recess therein for receiving an end of a copy roll supporting axis;
   a back plate extending between, and interconnecting said ends plates; and
   an angle flange secured to said back plate and adapted for supporting said copy roll supporting subassembly on said reproducing apparatus.

4. A system for duplicating elongated documents as defined in claim 3 wherein said bracket is of inverted U-shaped configuration and includes:
   a pair of spaced, parallel legs secured to, and projecting from, said end plates; and
   a channel web extending between said legs and spaced from said frame, said channel web having said detent release lever mounted thereon with said detent stud projecting from one side thereof.

5. A system for duplicating elongated documents as defined in claim 1 wherein said actuating means comprises:
   an elongated flexible lanyard connected at one end to said detent release lever.

6. A system for duplicating elongated documents as defined in claim 1 wherein said document feed tray comprises:
   a generally rectangular bottom plate having a plurality of sets of openings therethrough, the openings in each set extending parallel to the openings in every other set, and extending parallel to the side edges of said bottom plate;
   a pair of spaced, parallel side plates projecting upwardly from opposite side edges of said bottom plate;
   a plurality of indexing ribs on the bottom side of said bottom plate;
   a plurality of paper stop ribs on the upper side of said bottom plate;
   a divider plate detachably engageable with selected ones of the sets of openings in the bottom plate and extending parallel to said side plates; and
   a dancer rod extending between and supported by said side plates and spaced above said bottom plate for guiding document fed to said reproducing apparatus from said feed tray.

7. A system for duplicating elongated document as defined in claim 4 wherein said cocking lever is an elongated element having one end pivotally connected to one of the legs of said U-shaped bracket, and said cutting means is elongated, flexible; and
   wherein one end of said cutting means is connected to one of the side plates of the frame at a location below the point of pivotal connection of the cocking lever elongated element to the U-shaped bracket, and the other end of the cutting means is connected to the elongated element near its other end.

8. A system for duplicating elongated documents as defined in claim 7 wherein said cutting means comprises:
   an elongated textile string having one end connected to said cocking lever; and
   a spring having one end connected to the opposite end of said string from the end of the string connected to said cocking lever, and having its other end connected to said frame.

9. A system for duplicating elongated documents as defined in claim 7 wherein said actuating means comprises an elongated flexible lanyard connected at one end to said detent release lever.

10. A system for duplicating elongated documents as defined in claim 8 wherein said actuating means comprises an elongated flexible lanyard connected at one end to said detent release lever.

11. A system for duplicating elongated documents as defined in claim 3 wherein said document feed tray comprises:
   a generally rectangular bottom plate having a plurality of sets of openings therethrough, the openings in each set extending parallel to the openings in every other set, and extending parallel to the side edges of said bottom plate;
   a pair of spaced, parallel side plates projecting upwardly from opposite side edges of said bottom plate;
   a plurality of indexing ribs on the bottom side of said bottom plate;
   a plurality of paper stop ribs on the upper side of said bottom plate;
   a divider plate detachably engageable with selected ones of the sets of openings in the bottom plate and extending parallel to said side plates; and
   a dancer rod extending between and supported by said side plates and spaced above said bottom plate for guiding document fed to said reproducing apparatus from said feed tray.

12. A device for supporting a roll of elongated copy paper and feeding the paper to a copying machine comprising:
   a copy paper roll supporting frame;
   a flange on the frame for connecting the frame to a copy machine;
   an inverted U-shaped bracket mounted on the frame and projecting upwardly therefrom;

a detent release lever pivotally mounted on the bracket and including a detent stud;

an elongated cocking lever having a first end pivotally connected to the frame and a second end;

an elongated flexible paper cutting member having one end connected to the frame and having a second end connected to the cocking lever at a location to permit said flexible cutting member to be engaged with the detent stud when the cocking lever is pivoted in one direction and to be tensioned when the cocking lever is pivoted in the opposite direction; and an elongated flexible lanyard having an end connected to the detent release lever to facilitate pivoting the detent release lever from a remote location.

13. A device for supporting a roll of elongated copy paper and feeding the paper to a copying machine as defined in claim 12 wherein said cocking lever is mounted for pivotation in a vertical plane, said cutting member is connected for movement in a vertical plane when said cocking lever is pivoted, and said detent stud has an upwardly curved lower side permitting said cutting member to slide over and vertically past said detent stud when said cocking lever is pivoted upwardly.

14. A device for supporting a roll of elongated copy paper and feeding the paper to a copying machine as defined in claim 12 wherein said detent release lever is mounted on said bracket so that said detent stud extends horizontally from one side of said bracket in one operating position of said detent stud, and is withdrawn into an opening in said bracket when said lanyard is tensioned to pivot the detent release lever.

15. A device for feeding an elongated, continuous web of copy paper from a roll to a copying machine comprising:

a copy paper roll supporting frame including spaced side plates having notches therein for receiving a shaft upon which a roll of copy paper is rotatably supported;

means on the frame for detachably supporting the frame on one side of a copying machine;

means projecting upwardly from the frame for supporting, at an elevated position, a trigger element adapted to hook under an elongated flexible member;

an elongated cocking lever having a first end pivotally connected to said frame or to said upwardly projecting means, and adapted for pivotation in a vertical plane;

an elongated flexible, resilient paper cutting subassembly having one end connected to the frame and the second end connected to the cocking lever at locations of connections such that said flexible paper cutting subassembly will be engaged with said trigger element when the cocking lever is pivoted vertically upwardly to carry said flexible cutting member subassembly past said trigger element, and is then pivoted downwardly to engage said flexible paper cutting subassembly with said trigger element with further downward pivotal movement of said cocking lever inducing substantial tension in said flexible paper cutting subassembly;

means for latching the cocking lever in a cocked position; and trigger release means for releasing the trigger from a remote location to release said elongated flexible paper cutting subassembly to thereby cut through copy paper extended from a copy paper roll into a copying machine.

16. A document feed tray for feeding original documents to a xerographic copying machine comprising:

a divider plate;

a generally rectangular bottom plate having opposed side edges and a forward edge;

means on said bottom plate facilitating selective placement of said divider plate at one of selected multiple locations thereon in which said divider plate extends substantially parallel to the side edges of said bottom plate, and extends upwardly from said bottom plate in a vertical plane located at selectively varied distances from the side edges of said bottom plate;

a pair of spaced, parallel side plates projecting vertically upwardly from the opposite side edges of said bottom plate;

a plurality of paper stop ribs on the upper side of said bottom plate and spaced from said front edge of said bottom plate for providing an abutment against which aligned folds of a fan-fold stack of a document can be abutted as said document is fed to a copying machine;

means on the bottom side of said bottom plate for indexing said document feed tray on the upper side of a copying machine to which document is to be fed; and a dancer rod extending between, and supported by, said side plates, and located between the front edge of said bottom plate and said paper stop ribs for guiding a document fed to said reproducing apparatus from said feed tray.

* * * * *